(No Model.)

M. COOPER.
Turpentine Box and Trough.

No. 240,576. Patented April 26, 1881.

Witnesses:
F. M. Burnham
Daniel Breed

Inventor:
Montraville Cooper
Rev. J. S. Duffie
Att'y

UNITED STATES PATENT OFFICE.

MONTRAVILLE COOPER, OF COLUMBIA, SOUTH CAROLINA.

TURPENTINE BOX AND TROUGH.

SPECIFICATION forming part of Letters Patent No. 240,576, dated April 26, 1881.

Application filed December 1, 1880. (No model.)

*To all whom it may concern:*

Be it known that I, MONTRAVILLE COOPER, a citizen of the United States, residing at Columbia, in the county of Richland, in the State of South Carolina, have invented a new and valuable Improvement in Turpentine Boxes and Troughs, for gathering, collecting, and saving virgin turpentine as it runs from the scarified surface of the tree.

Some of the advantages of my invention are: My box can be moved up the tree from time to time as the scarifying is renewed, thus always securing virgin drips. It saves the owners of turpentine-orchards from ruin by fire or serious loss, which frequently occurs when dependence is had upon boxes cut in the tree. It prevents waste by the drip falling outside of the box. It enables the working of a tree to any height. It enables the collecting of turpentine with greater facility, as my box can be removed from the tree with great ease, emptied, and replaced immediately. The scar necessarily inflicted on the tree is so slight that it will more than probably heal over in a few years, thus enabling the tree to be reworked for an indefinite length of time.

Figure 1:
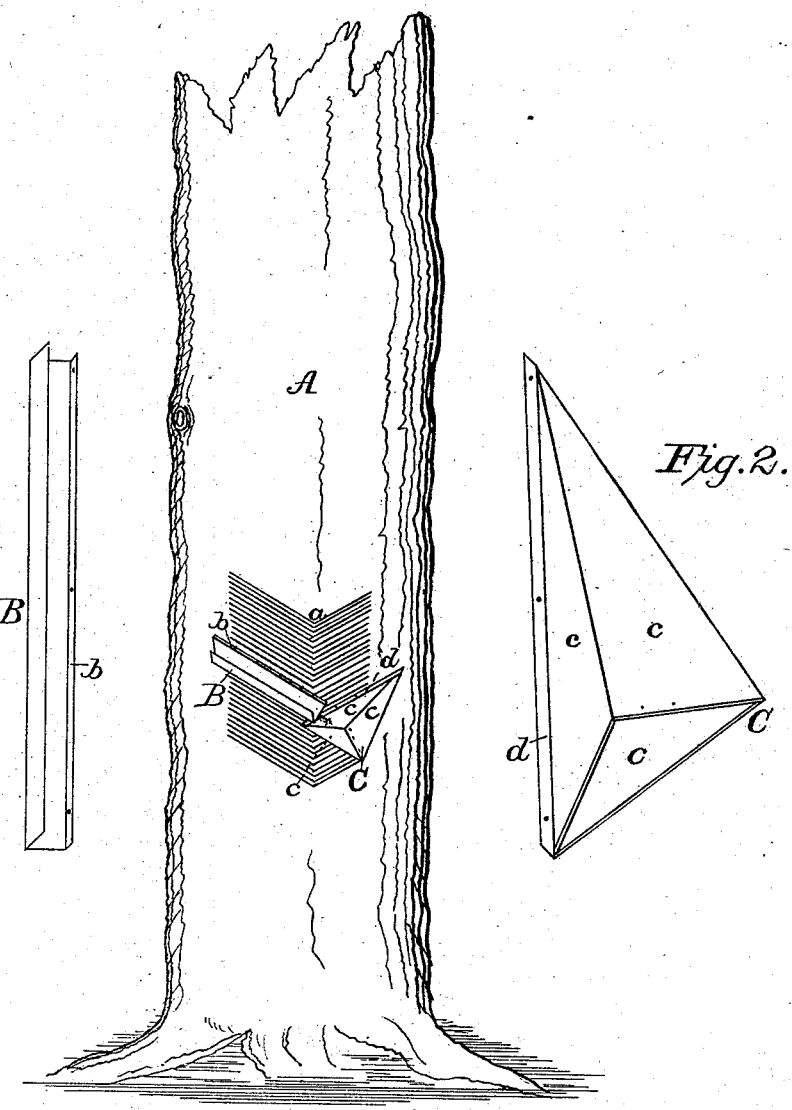
Figure 2:
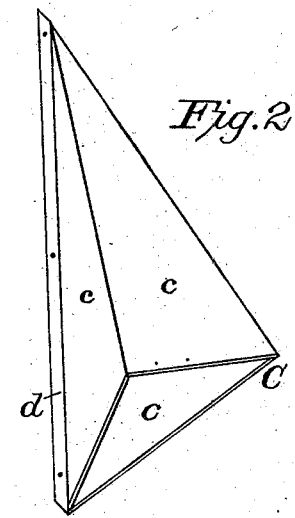

In the accompanying drawings, Figure 1 represents a side elevation of a tree with the box and trough arranged in position; Fig. 2, a perspective view of the box, and Fig. 3 a perspective view of the trough.

A, Fig. 1, represents the tree, having its side $a$ scarified.

C, Fig. 2, represents a triangular box, having two triangular sides, $c\ c$, and one triangular end piece, $c$, and having a flange, $d$, by which the same is to be secured to the scarified part of the tree by means of small spikes or nails, and is for the purpose of receiving the virgin turpentine as it runs from the tree, and also from the trough B.

Figure 3:
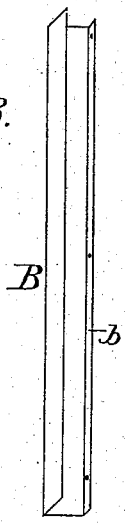

B, Fig. 3, represents a V-shaped trough, having a flange, $b$, by which the same is to be secured to the scarified part of the tree by means of small spikes or nails. This trough is for the purpose of receiving the virgin turpentine as it runs from the tree and conducting the same into box C.

Having thus fully described my invention, what I claim as new, and desire to secure by Letters Patent, is—

The combination, with the triangular box C, formed as described, and having a flange, $d$, of the V-shaped trough B, having a flange, $b$, constructed and arranged to operate as set forth.

MONTRAVILLE COOPER.

Witnesses:
EBEN STENHOUSE,
A. MACAULAY.